(12) United States Patent
Hayman et al.

(10) Patent No.: US 12,409,912 B2
(45) Date of Patent: Sep. 9, 2025

(54) TURRET MOORING SYSTEM

(71) Applicant: SUSTAINABLE MARINE ENERGY LIMITED, Edinburgh (GB)

(72) Inventors: Jason Hayman, Edinburgh (GB); Christopher Burden, Edinburgh (GB); Nicholas Cresswell, Edinburgh (GB)

(73) Assignee: SUSTAINABLE MARINE ENERGY LIMITED, Edinburgh (GB)

( * ) Notice: Subject to any disclaimer, the term of this patent is extended or adjusted under 35 U.S.C. 154(b) by 637 days.

(21) Appl. No.: 17/757,214

(22) PCT Filed: Dec. 18, 2020

(86) PCT No.: PCT/GB2020/053307
§ 371 (c)(1),
(2) Date: Jun. 10, 2022

(87) PCT Pub. No.: WO2021/123825
PCT Pub. Date: Jun. 24, 2021

(65) Prior Publication Data
US 2023/0002012 A1 Jan. 5, 2023

(30) Foreign Application Priority Data
Dec. 20, 2019 (GB) ..................... 1919097

(51) Int. Cl.
*B63B 21/50* (2006.01)
*F03B 13/26* (2006.01)

(52) U.S. Cl.
CPC .......... *B63B 21/507* (2013.01); *F03B 13/264* (2013.01); *B63B 2021/505* (2013.01)

(58) Field of Classification Search
CPC ....... B63B 21/00; B63B 21/50; B63B 21/507; B63B 21/508; B63B 2021/505; B63J 2003/046; F03B 13/264; Y02E 10/30
(Continued)

(56) References Cited

U.S. PATENT DOCUMENTS 4,606,727 A 8/1986 Koenig et al.
5,476,059 A 12/1995 Pollack
(Continued)

FOREIGN PATENT DOCUMENTS

CN 106114762 A 11/2016
GB 2150517 A 7/1985
(Continued)

OTHER PUBLICATIONS

Notice of Reasons for Refusal dated Oct. 28, 2024 from Japanese Patent Application No. 2022-536977 (14 pages).
(Continued)

*Primary Examiner* — Daniel V Venne
(74) *Attorney, Agent, or Firm* — INNOVATION CAPITAL LAW GROUP, LLP; Vic Lin

(57) ABSTRACT

Disclosed herein is a turret mooring system for a tidal turbine assembly 150, which increases the ratio of the torque exerted by the turret 100 relative to frictional forces between the turret 100 and the assembly 150 moored to the turret 100. In some examples, the frictional forces are reduced by the turret providing an upward force to the assembly, which also resists pitching moments. In other examples, the torque exerted by the turret 100 is increased by the use of a bifurcated mooring line 106, 108 which couples to two spaced apart attachment points 128 on a chain table 104 of the turret 100 and to a single point 114 on the water bed.

17 Claims, 6 Drawing Sheets

(58) Field of Classification Search
USPC .............................. 114/230.1, 230.12, 230.13
See application file for complete search history.

(56) References Cited

U.S. PATENT DOCUMENTS

| | | | | |
|---|---|---|---|---|
| 6,126,501 | A * | 10/2000 | Hooper | B63B 21/507 |
| | | | | 441/5 |
| 6,484,659 | B2 * | 11/2002 | Hobdy | B63B 21/507 |
| | | | | 114/230.1 |
| 6,990,917 | B2 * | 1/2006 | Boatman | E21B 19/004 |
| | | | | 114/230.12 |
| 7,225,749 | B2 * | 6/2007 | Boatman | B63B 21/507 |
| | | | | 114/230.12 |
| 2008/0182467 | A1 | 7/2008 | Boatman et al. | |
| 2009/0092449 | A1 | 4/2009 | Sveen | |

FOREIGN PATENT DOCUMENTS

| | | |
|---|---|---|
| GB | 2559996 A | 8/2018 |
| JP | 2019512643 A | 5/2019 |
| WO | 8903338 A1 | 4/1989 |
| WO | 9930963 A1 | 6/1999 |
| WO | 2002032753 A1 | 4/2002 |
| WO | 2018154313 A1 | 8/2018 |

OTHER PUBLICATIONS

Combined Search and Examination Report dated Jan. 29, 2020 from Application No. GB1919097.4, 5 pages.
Search Report dated Mar. 16, 2020 from Application No. GB1919097.4, 2 pages.
International Search Report & Written Opinion dated Apr. 6, 2021 from PCT Application No. PCT/GB2020/053307.

* cited by examiner

TURRET MOORING SYSTEM

The present invention relates to a turret mooring system and in particular to a turret mooring system adapted for use in turbine assemblies for extracting energy from tidal flows.

Turret moorings are moorings which allow a moored vessel to swing around (about a yaw axis) in response to local currents. Typically they are used in locations in which there is no predominant flow direction, meaning that the moored vessel swings in response to local wind and wave forces. Since in principle, these currents and forces can come from any direction, the turret mooring is anchored to the water bed in a generally circular arrangement, converging to a central point (the turret) in order to omnidirectionally resist drifting which would otherwise be caused by the wind and waves.

In tidal power systems, the flow is strongly bidirectional—that is, the flow is strongly in a first direction when the tide is coming in, substantially zero at high tide, strongly in a second direction (substantially opposite the first direction) as the tide is going out, and substantially zero at low tide, at which point the cycle repeats. It may seem therefore turret moorings are an ideal candidate for tidal power generation systems as they would allow the power system to swing around to align with current flows and only two anchoring points on the water bed would be needed: upstream and downstream anchoring points to resist the drifting motion introduced by the flow in each of the two principle directions making up the bidirectional local flow.

However, typical turret mooring systems are usually installed in locations in relatively deep water, for example where the mean water depth $d_M = (d_H + d_L)/2$ is much larger than the variance in depth between high and low tide $\delta d = d_H - d_L$, in which $d_M$, $\delta d$, $d_H$ and $d_L$ are respectively the mean water depth; the variance in depth; the depth at high tide; and the depth at low tide. In such cases the rise and fall of the moored vessel is small compared to the typical distance of the vessel above the water bed and the configuration of the mooring system is relatively unchanged over a tidal cycle.

This is not typically true for locations in which tidal power generation systems are moored. Here a relatively large tidal range is chosen to maximise power generation potential. This usually means anchoring the assembly close to shore since it is geographic features associated with shorelines which tend to create large tidal ranges and flows. In addition, installing the assembly close to shore simplifies the installation and also makes transmission of the generated power to the shore easier. This tends to lead to a relatively large ratio of $\delta d$ to $d_M$, which in turn leads to the mooring lines becoming slack at low tide. Slack lines are poor at resisting rotation and it has been found that they can fail to hold the turret still relative to the water bed. The overall result is that when the tide changes, rather than the assembly swinging around the turret to align with the local flow, the whole assembly including the turret yaws around. Over several cycles this can lead to the mooring lines becoming tangled or twisted. Due to the strongly bidirectional nature of the flow, increasing the number of mooring lines has little to no effect in resisting the tangling. Indeed, quite apart from the increased cost and complexity of anchoring additional mooring lines to the water bed, a greater number of mooring lines are undesirable as they can worsen the tangling as there are simply more mooring lines to tangle with one another.

The present invention aims to address the above problems.

Presented herein are a series of closely related solutions to the above problems.

Disclosed herein is a turret mooring system for a tidal turbine assembly, the turret mooring system comprising: a turret having: a shaft for mounting to the tidal turbine assembly and for allowing relative motion between the turret and the tidal turbine assembly about a rotational axis; and a chain table secured to a lower end of the shaft; an upstream mooring line for coupling a single upstream anchoring point on a water bed to an upstream portion of the chain table; and a downstream mooring line for coupling a single downstream anchoring point on the water bed to a downstream portion of the chain table; wherein the upstream mooring line is a bifurcated mooring line for coupling to two spaced apart upstream attachment points on the upstream portion of the chain table; and/or wherein the downstream mooring line is a bifurcated mooring line for coupling to two spaced apart downstream attachment points on the downstream portion of the chain table.

As used herein, the terms "upstream" and "downstream" refer broadly to the predominant flow directions during a rising and a falling tide, which are approximately opposite directions. It will be apparent that the upstream and downstream directions switch when the tide changes from flowing out and flowing in (and vice-versa). However, at all times there is a clearly defined upstream (and downstream) direction. Moreover, the predominant flow direction is a horizontal axis defining an upstream-downstream axis, sometimes referred to as the x-direction or x-axis. In the following description, the terms "front", "fore", "forward", "bow" and related terms shall refer to the upstream direction and as the positive x direction. Likewise "rear", "aft", "rearward", "backward", "stern" and related terms shall refer to the downstream direction and as the negative x direction.

The spaced apart attachment points are spaced apart in a direction (sometimes referred to as a spacing axis, the y-direction or the y-axis) which is horizontal and transverse to the upstream-downstream axis. For example, the spacing may be perpendicular to the upstream-downstream axis. Positive and negative directions in the y-axis shall be referred to respectively as "right" or "starboard" and "left" or "port". The x-axis and y-axis thus collectively form a horizontal plane (horizontal in this case means broadly perpendicular to the local gravity field). In this coordinate system, the turret shaft extends in a vertical direction (vertical in this case means broadly parallel to the local gravity field), sometimes referred to as the z-axis. Positive directions in the z-axis are referred to with terms such as "up", "top", "upper", "high", "higher" and so forth. Likewise, the negative z-axis direction is referred to as "down", "bottom", "lower", "low", etc. Clearly, and consistently with common usage, parts intended to be out of the water (when the assembly is anchored in place) are higher than those parts intended to be submerged in the water. The three axes (x, y and z) thus form a convenient and coherent coordinate system for consistently describing how the various parts of the system are spatially related to one another.

When the assembly is installed, the turret is mounted in the assembly, in such a way that the coupling is arranged to allow relative rotation between the turret and the tidal turbine assembly. In addition, the upstream and downstream mooring lines are coupled to their respective attachment points on the chain table, the spacing (in the y-direction) between the attachment points on the chain table increases the lever arm of the mooring system on the turret. Rotation of the turret in either direction relative to the water bed requires the turret to act against the tension in one of two diverging strands of the bifurcated mooring line. In turn the tension in the diverging strands resists rotation of the turret. This approaches the problem of only two anchoring points on a water bed providing insufficient torque between the turret and the assembly to overcome internal friction and result in relative rotational motion between the turret and the assembly by using a bifurcated mooring line to space the attachment points and increase the torque provided by the turret by ensuring mooring line tension is present to counteract rotations in either direction. In other words, the spaced attachment points and bifurcated mooring line are able to hold the turret steady and inhibit the turret from rotating relative to the water bed (meaning that the turbine assembly rotates relative to the turret and the water bed).

In addition, the use of a bifurcated mooring line allows this effect to be achieved with only a single anchoring point on the water bed for each mooring line, thus reducing installation cost without compromising the stability of the turret against rotating relative to the water bed. This helps to reduce the likelihood of the mooring system becoming tangled.

Optionally, the bifurcation occurs (or alternatively the bridle is located) closer to the turret than to the water bed. For example the bifurcation (or bridle) is located 90% or more along the length of the mooring line as measured from the water bed.

In some cases, depending on the local terrain and tidal flow patterns, it may be possible to use only a single bifurcated mooring line, for example where the tidal flow is asymmetric, such that the tangling problem described above is most likely to occur in one flow direction, but quite unlikely to occur in the other. As an example, the mooring lines tend to be relatively taut when the tide starts to flow out, so the turret is held reasonably firmly and the problem of tangling is less severe. When the tide is coming in, by contrast, both lines are slack, and the problem is at its worst. However, due to the direction of flow, the tidal turbine assembly is pushed in a downstream direction and the upstream line becomes taut. In this case, only the mooring line which is upstream when the tide is coming in may need to be bifurcated in order to provide the desired effect. In other cases, suitable designs may have a bifurcation only on the downstream mooring line (when the tide is coming in). Of course, in many applications both mooring lines being bifurcated provides a good level of resistance to the turret rotating relative to the sea bed (and thus tangling is resisted).

Optionally the spaced apart upstream and/or downstream attachment points on the chain table are spaced apart by at least 1 metre. A relatively large spacing increases the lever action in the sense that the increase in tension in one of two diverging strands of the bifurcated mooring line due to a given angle of rotation of the turret increases with increasing mooring line spacing and thereby improves the turret's resistance to turning relative to the water bed.

Optionally the upstream mooring line has a first portion for coupling the upstream anchoring point on the sea bed to a bridle and a second portion for coupling the bridle to two upstream attachment points on the upstream portion of the chain table; and/or the downstream mooring line has a first portion for coupling the downstream anchoring point on the sea bed to a bridle and a second portion for coupling the bridle to two downstream attachment points on the downstream portion of the chain table. In other words, the second portion of the mooring line comprises a pair of lines providing parallel load paths, while diverging from one another, one connected to each of the spaced apart attachment points on the chain table. The bridle has three attachment points, one for connecting to the first portion of the mooring line and two for the second portion. The bridle is the portion which allows the mooring line to bifurcate. Optionally the first and second portions of the upstream or downstream mooring line are made from different materials. This allows the lower portions of the mooring line (those connected to the anchoring point) and the upper portions of the mooring line (those connected to the chain table) to be designed in a manner specific to the role they are each intended to fulfil.

For example, the first portion of the upstream or downstream mooring line may be a chain and/or the second portion of the upstream or downstream mooring line may be a pair of low mass synthetic cables. The chain connection forms a strong connection, which can be useful in cases where wear resistance is important, e.g. where the line may come into contact with the water bed, while the low mass synthetic cable provides a lightweight and adaptable mooring system, improving the handling characteristics.

Optionally the turret is arranged to provide an upward force when the chain table is submerged in water. The upward force can counteract the downward force due to the weight of the turret (due to the turret mass) and the downward component of the mooring line tension. This in turn reduces the turning friction and thus helps to allow the tidal turbine assembly to rotate relative to the turret and reduces the likelihood of tangling.

Optionally the upward force is provided by an element which is buoyant in water. This buoyancy results in an upward force which is present irrespective of water flow. In particular, the point at which the tangling problem is worst is at slack low tide, when tidal flow is zero, and when there may be no other local flows. Providing a buoyant element (such as an air pocket, a foam, filled region, etc.) ensures that the friction reducing effect described above is present even when there is no flow. The buoyant element may be housed in the chain table, thereby allowing the upward force to be provided at the base of the shaft in order to lift the shaft from directly below and avoid the introduction of twisting actions. In other examples, the buoyant element may be located in the lower portion of the shaft. The buoyant element can be chosen to have a desired buoyancy by selecting the material to suit the application. In addition, the expected density of the water at the installation site can be factored into the decision.

The element may have a variable buoyancy. For example, the buoyancy can be varied to change the attitude and/or orientation of the tidal turbine assembly in the water. This variation can be altered on a cycle, for example to adapt to known, predicted, regular or cyclical effects such. In other examples, the buoyancy can be varied in an adaptive manner, where the attitude and/or orientation of the tidal turbine assembly is measured and the buoyancy of the element can be adjusted to cause a desired change in attitude and/or orientation. The buoyancy of the element may be variable by pumping air through the shaft, for example to the buoyant element, for example to the chain table. The use of air is a convenient option as air is abundant and easily available. The shaft provides a convenient way to deliver air to the chain table.

Additionally or alternatively, the upward force may be provided by a hydrodynamic fairing on the chain table. The fairing may cover all or only some of the chain table. The use of a hydrodynamic fairing provides the strongest upward forces when the current is strongest, with the exact relationship depending on the shape of the hydrodynamic fairing. This can be useful in helping to prevent the tangling problem identified above, but can also help to hold the tidal turbine assembly steady while generating power. This is because the turbines being driven creates a large and time varying thrust (time varying in the sense that it depends on the time dependent flow velocity). This thrust in turn generates a pitching moment. The hydrodynamic surface allows the turret to counteract the pitching moment. Since both the hydrodynamic lift and the turbine thrust are dependent on the flow velocity, the hydrodynamic fairing provides a convenient passive stabilisation effect. The hydrodynamic fairing may further be shaped to counteract the expected pitching moments in the tidal turbine assembly due to drag on the turbines. In other words, the fairing may be shaped to provide an upward force profile with respect to flow velocity and which approximately matches the profile of the thrust force produced by the turbines with respect to flow velocity.

In combination with a fixed buoyancy, the upward force from the buoyancy and a given design of hydrodynamic fairing has the form $F_z=B+L(v)$, in which B is a constant upward force due to a fixed buoyancy and $L(v)$ represents a variable lift force which is a function of at least the flow velocity, v, and the shape of the fairing. When the buoyancy is variable, the equation becomes $F(t)=B(t)+L(v)$, where the total upward force and the buoyancy are dependent on time (t). The lift force from the hydrodynamic fairing is also dependent on time via the time dependence of the flow velocity, e.g. due to tidal changes and local currents. These basic equations can be used to guide design of both the buoyant element and the hydrodynamic fairing to achieve the desired effect.

In particular, it may be difficult to achieve exact cancellation of the pitching moment due to the turbine thrust (in terms of magnitude of force and/or profile of force with respect to flow velocity) using just a hydrodynamic fairing. In such cases, a fixed buoyancy may be used to bring the hydrodynamic lift closer to complete counteraction of the pitching moment. Additionally where the profile of the hydrodynamic lift (the dependence of the lift on the flow velocity) does not match the profile of the turbine thrust, variable buoyancy may be used to improve the match, either by fitting to expected flow conditions, or by adapting based on live measurements.

In some examples, it may be desirable to use a fixed buoyancy to exactly balance the turret mass and downward component of mooring line tension at low tide so that the vertical frictional force is substantially zero. However, this in combination with the hydrodynamic lift when current is flowing can cause the upward force to more than overcome the downward force on the turret due to the mass of the turret and the downward component of the tension in the mooring lines. This causes the turret to locally lift the tidal turbine assembly and allows the pitching moments due to turbine thrust to be counteracted and in some cases completely cancelled. While this would introduce a rotational friction into relative rotational motion between the turret and the tidal turbine assembly, typically the conditions in which the upward force is counteracting pitching moments are conditions in which substantially no relative rotation is expected, since the current is usually not changing direction when the tide is rising or falling. In fact, increases in friction can help keep the turbine assembly stable in flow by resisting rotation, while allowing as much pitch balancing lift and buoyancy forces as desired to be supplied. In this way the buoyancy and lift forces can be tailored to the expected pitching moment from turbines as a function of flow speed.

The hydrodynamic fairing may be bi-directional in the sense that the fairing is arranged to provide lift when water is flowing over the fairing in each of the two principle flow directions. In some cases, the hydrodynamic fairing is symmetric in an upstream-downstream direction. Typically symmetric fairings have reduced performance (less lift generated) than unidirectional fairings, but in the present case where flow is expected to be along two predominant directions, a stable system in bidirectional flow can outweigh the greater lift which can be generated in only one direction. Where a fairing is provided with a fixed or variably buoyant element, the buoyant element can be housed inside the fairing.

Also disclosed herein is a turret mooring system for a tidal turbine assembly, the turret mooring system comprising: a turret having a shaft for mounting to the tidal turbine assembly and for allowing relative motion between the turret and the tidal turbine assembly about a rotational axis and a chain table secured to a lower end of the shaft; wherein the turret is arranged to provide an upward force when the chain table is submerged in water. The upward force can counteract the downward force due to the weight of the turret (due to the turret mass) and the downward component of the mooring line tension. This in turn reduces the turning friction and thus helps to allow the tidal turbine assembly to rotate relative to the turret and reduces the likelihood of tangling.

This approaches the problem of only two anchoring points on a water bed providing insufficient torque between the turret and the assembly to overcome internal friction and result in relative rotational motion between the turret and the assembly by reducing internal frictions in the motion between the turret and the tidal turbine assembly. This occurs by the upward force provided by the turret reducing the vertical component of friction. Since the frictional force impeding relative rotation of the turret and the turbine assembly has been reduced, relative rotational motion is easier and the turbine assembly is able to rotate relative to the turret and the water bed.

Optionally the upward force is provided by an element which is buoyant in water. This buoyancy results in an upward force which is present irrespective of water flow. In particular, the point at which the tangling problem is worst is at slack low tide, when tidal flow is zero, and when there may be no other local flows. Providing a buoyant element (such as an air pocket, a foam, filled region, etc.) ensures that the friction reducing effect described above is present even when there is no flow. The buoyant element may be housed in the chain table, thereby allowing the upward force to be provided at the base of the shaft in order to lift the shaft from directly below and avoid the introduction of twisting actions. In other examples, the buoyant element may be located in the lower portion of the shaft. The buoyant element can be chosen to have a desired buoyancy by selecting the material to suit the application. In addition, the expected density of the water at the installation site can be factored into the decision.

The element may have a variable buoyancy. For example, the buoyancy can be varied to change the attitude and/or orientation of the tidal turbine assembly in the water. This variation can be altered on a cycle, for example to adapt to known, predicted, regular or cyclical effects such. In other examples, the buoyancy can be varied in an adaptive manner, where the attitude and/or orientation of the tidal turbine assembly is measured and the buoyancy of the element can be adjusted to cause a desired change in attitude and/or orientation. The buoyancy of the element may be variable by pumping air through the shaft, for example to the buoyant element, for example to the chain table. The use of air is a convenient option as air is abundant and easily available. The shaft provides a convenient way to deliver air to the chain table.

Additionally or alternatively, the upward force may be provided by a hydrodynamic fairing on the chain table. The fairing may cover all or only some of the chain table. The use of a hydrodynamic fairing provides the strongest upward forces when the current is strongest, with the exact relationship depending on the shape of the hydrodynamic fairing. This can be useful in helping to prevent the tangling problem identified above, but can also help to hold the tidal turbine assembly steady while generating power. This is because the turbines being driven creates a large and time varying thrust (time varying in the sense that it depends on the time dependent flow velocity). This thrust in turn generates a pitching moment. The hydrodynamic surface allows the turret to counteract the pitching moment. Since both the hydrodynamic lift and the turbine thrust are dependent on the flow velocity, the hydrodynamic fairing provides a convenient passive stabilisation effect. The hydrodynamic fairing may further be shaped to counteract the expected pitching moments in the tidal turbine assembly due to drag on the turbines. In other words, the fairing may be shaped to provide an upward force profile with respect to flow velocity and which approximately matches the profile of the thrust force produced by the turbines with respect to flow velocity.

In combination with a fixed buoyancy, the upward force from the buoyancy and a given design of hydrodynamic fairing has the form $F_z=B+L(v)$, in which B is a constant upward force due to a fixed buoyancy and $L(v)$ represents a variable lift force which is a function of at least the flow velocity, v, and the shape of the fairing. When the buoyancy is variable, the equation becomes $F(t)=B(t)+L(v)$, where the total upward force and the buoyancy are dependent on time (t). The lift force from the hydrodynamic fairing is also dependent on time via the time dependence of the flow velocity, e.g. due to tidal changes and local currents. These basic equations can be used to guide design of both the buoyant element and the hydrodynamic fairing to achieve the desired effect.

In particular, it may be difficult to achieve exact cancellation of the pitching moment due to the turbine thrust (in terms of magnitude of force and/or profile of force with respect to flow velocity) using just a hydrodynamic fairing. In such cases, a fixed buoyancy may be used to bring the hydrodynamic lift closer to complete counteraction of the pitching moment. Additionally where the profile of the hydrodynamic lift (the dependence of the lift on the flow velocity) does not match the profile of the turbine thrust, variable buoyancy may be used to improve the match, either by fitting to expected flow conditions, or by adapting based on live measurements.

In some examples, it may be desirable to use a fixed buoyancy to exactly balance the turret mass and downward component of mooring line tension at low tide so that the vertical frictional force is substantially zero. However, this in combination with the hydrodynamic lift when current is flowing can cause the upward force to more than overcome the downward force on the turret due to the mass of the turret and the downward component of the tension in the mooring lines. This causes the turret to locally lift the tidal turbine assembly and allows the pitching moments due to turbine thrust to be counteracted and in some cases completely cancelled. While this would introduce a rotational friction into relative rotational motion between the turret and the tidal turbine assembly, typically the conditions in which the upward force is counteracting pitching moments are conditions in which substantially no relative rotation is expected, since the current is usually not changing direction when the tide is rising or falling. In fact, increases in friction can help keep the turbine assembly stable in flow by resisting rotation, while allowing as much pitch balancing lift and buoyancy forces as desired to be supplied. In this way the buoyancy and lift forces can be tailored to the expected pitching moment from turbines as a function of flow speed.

The hydrodynamic fairing may be bi-directional in the sense that the fairing is arranged to provide lift when water is flowing over the fairing in each of the two principle flow directions. In some cases, the hydrodynamic fairing is symmetric in an upstream-downstream direction. Typically symmetric fairings have reduced performance (less lift generated) than unidirectional fairings, but in the present case where flow is expected to be along two predominant directions, a stable system in bidirectional flow can outweigh the greater lift which can be generated in only one direction. Where a fairing is provided with a fixed or variably buoyant element, the buoyant element can be housed inside the fairing.

Optionally an upstream portion of the chain table is configured to couple to a single upstream anchoring point on a water bed via an upstream mooring line and wherein a downstream portion of the chain table is configured to couple to a single downstream anchoring point on a water bed via a downstream mooring line. This example may further include the upstream and downstream mooring lines. This provides a complete mooring system.

Optionally, the upstream mooring line is a bifurcated mooring line for coupling to two spaced apart upstream attachment points on the upstream portion of the chain table; and/or wherein the downstream mooring line is a bifurcated mooring line for coupling to two spaced apart downstream attachment points on the downstream portion of the chain table. Rotation of the turret in either direction relative to the water bed requires the turret to act against the tension in one of two diverging strands of the bifurcated mooring line. In turn the tension in the diverging strands resists rotation of the turret, thereby reducing the likelihood of tangling.

Optionally, the bifurcation occurs (or alternatively the bridle is located) closer to the turret than to the water bed. For example the bifurcation (or bridle) is located 90% or more along the length of the mooring line as measured from the water bed.

Optionally the spaced apart upstream and/or downstream attachment points on the chain table are spaced apart by at least 1 metre. This increases the lever action in the sense that the increase in tension in one of two diverging strands of the bifurcated mooring line due to a given angle of rotation of the turret increases with increasing mooring line spacing and thereby improves the turret's resistance to turning relative to the water bed. In combination with the reduced turning friction, this provides a system which is much less prone to tangling.

Optionally the upstream mooring line has a first portion for coupling the upstream anchoring point on the sea bed to a bridle and a second portion for coupling the bridle to two upstream attachment points on the upstream portion of the chain table; and/or the downstream mooring line has a first portion for coupling the downstream anchoring point on the sea bed to a bridle and a second portion for coupling the bridle to two downstream attachment points on the downstream portion of the chain table. In other words, the second portion of the mooring line comprises a pair of lines providing parallel load paths, while diverging from one another, one connected to each of the spaced apart attachment points on the chain table. The bridle has three attachment points, one for connecting to the first portion of the mooring line and two for the second portion. The bridle is the portion which allows the mooring line to bifurcate. Optionally the first and second portions of the upstream or downstream mooring line are made from different materials. This allows the lower portions of the mooring line (those connected to the anchoring point) and the upper portions of the mooring line (those connected to the chain table) to be designed in a manner specific to the role they are each intended to fulfil.

For example, the first portion of the upstream or downstream mooring line may be a chain and/or the second portion of the upstream or downstream mooring line may be a pair of low mass synthetic cables. The chain connection forms a strong connection, which can be useful in cases where wear resistance is important, e.g. where the line may come into contact with the water bed, while the low mass synthetic cable provides a lightweight and adaptable mooring system, improving the handling characteristics.

The following optional features may be included in either variant of the mooring system described above.

Optionally the shaft includes an upper radial bearing and a lower radial bearing for engaging with the tidal turbine assembly. This can help to provide support against twisting or toppling motions and to ensure a smooth rotation.

Optionally the turret is mounted into the tidal turbine assembly. This provides a complete apparatus ready for installation and operation.

Optionally, the turret is slidable in a vertical direction relative to the tidal turbine assembly. For example the turret may be arranged to slide for a portion of the length of the shaft to raise or lower the chain table relative to the tidal turbine assembly. In some cases, this may provide a reduced draft for transporting the assembly.

Optionally the shaft is a cluster of pipes. In other words, the shaft comprises a plurality of pipes held together to form a composite structure. The composite structure can include an outer protective casing. Forming the shaft in this way is a simple and cheap way to form a strong and robust shaft. In addition the lumens of the pipes can be used to send control signals between the turbine assembly and the chain table or even the shore, to transfer power generated by the assembly to shore, to supply air to the chain table to adjust the buoyancy, or any other functions of interest. A plurality of pipes can be used to keep these roles separate to reduce damage to electrical cables by pumping air, or to reduce cross-talk and interference between control lines or between control lines and high capacity power lines. The hollow cores of the pipes can also be used to provide buoyancy at the lower end of the shaft.

Also disclosed herein is a method of mooring a tidal turbine assembly to a water bed using the turret mooring system of any preceding claim, the method comprising: (i) transporting the tidal turbine assembly to an installation site; (ii) coupling an upstream portion of the chain table of the turret to the water bed at a single upstream anchoring point and coupling a downstream portion of the chain table of the turret to the water bed at a single downstream anchoring point; and (iii) securing the turret into the tidal turbine assembly. This provides a complete assembly installed at the desired location.

Optionally step (iii) is performed prior to steps (i) and (ii), and step (iii) is performed in a dock or on land. This can allow an operator to ensure that the sometimes complex mounting process is performed in a controlled environment so that safety checks can be performed.

Optionally, once step (iii) has been completed, the turret is slidable in a vertical direction relative to the tidal turbine assembly between a raised position and a lowered position such that the draft of the tidal turbine assembly is greater when the turret is in the lowered position than when it is in the raised position. Optionally, the turret is in the raised position during step (i). This can reduce the draft of the assembly during transport, making the transport process easier and more efficient. Once the assembly has arrived at its destination, the turret can be lowered so that the chain table is low enough below the water surface to avoid the turbines when they swing around in a current. While installed, it may also be advantageous to adjust the height of the turret, to adapt to changing water conditions, for example.

Optionally, the turret is arranged to provide an upward force when the chain table is submerged in water and the turret is slidable in a vertical direction; and wherein the vertical position of the turret is adjusted prior to or during step (i) to control the pitch of the tidal turbine assembly. This can help provide stability to the tidal turbine assembly during transport.

Optionally, the tidal turbine assembly includes one or more turbines which are configurable in a deployed arrangement in which they are below the expected water line (and optionally below a hull of the turbine assembly), and also in a raised arrangement in which the turbines are entirely above the expected water line (and optionally are supported on the tidal turbine apparatus, for example on a deck). The turbines may further be configured in the raised arrangement during step (i). This allows the turbines to be raised during transport to reduce drag forces while towing the assembly to the installation site, thereby improving installation efficiency.

Examples and embodiments will now be described in detail with reference to the Figures, in which.

Figure 1:
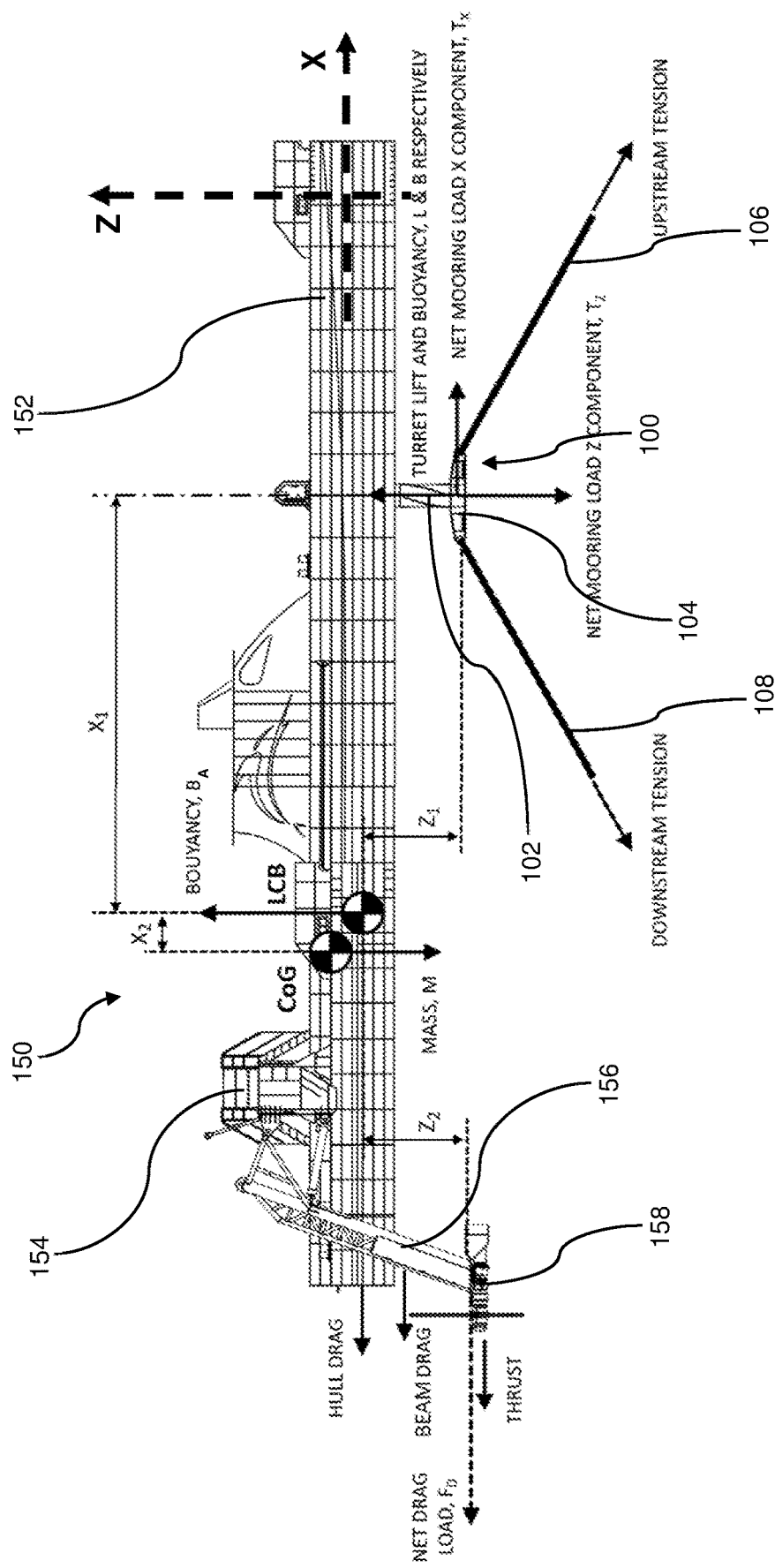
FIG. 1 shows a side elevation of a tidal turbine assembly moored with a turret mooring system when current is flowing.

FIG. 1 shows a tidal turbine assembly 150 moored to a water bed (not shown). The tidal turbine assembly 150 is buoyant and substantially rigid and comprises a body 152 encapsulated by a hull to allow the assembly to float at the water surface. The assembly 150 is shown from a side elevation with the x and z axes marked for convenience, where the arrows point in the positive direction for that axis. The y-axis is perpendicular to both the x- and z-axes (and therefore also to the plane of the image). Towards the rear or stern (negative x-direction) of the assembly 150, a turbine deployment module 154 is situated for raising and lowering one or more turbines 158 out of or into the water. The turbine(s) 158 is/are mounted at a distal end of a beam 156, and the beam 156 can be driven by the turbine deployment module 154 to swing upwardly out of the water to raise the turbine(s) 158 out of the water. This can help reduce the draft of the assembly 150 to ease transport of the assembly 150 to or from an installation site. In other examples, the turbine(s) 158 can be raised out of the water to prevent damage by rough seas or to repair or examine the turbine(s) 158. In any case, the reverse action can be instigated by the turbine deployment module 154 to swing the turbine(s) 158 back into the water, for example below the hull, so that power generation can begin (or resume power generation, as the case may be).

Towards the front or bow (positive x-direction) of the turbine assembly 150 is a turret 100 forming part of a mooring system. The turret mooring system comprises a shaft 102 which is secured to the tidal turbine assembly 150. The shaft 102 is mounted in the tidal turbine assembly 150 in such a way as to allow relative rotational motion between the turret 100 and the tidal turbine assembly 150. A chain table 104 is secured to the lower end (negative z-direction) of the shaft 102. The motions of the chain table 104 and the shaft 102 are both generally rigid structures and are coupled together such that rotation and vertical movements of one of the chain table 104 and the shaft 102 cause the same motion in the other one of the chain table 104 and the shaft 102.

An upstream mooring line 106 and a downstream mooring line 108 couple the chain table 104 to a water bed at respective upstream and downstream anchoring points (not shown). The chain table 104 is secured to the water bed in such a way that the mooring lines 106, 108 resist rotation of the chain table 104 relative to the water bed. This means that the shaft 102, and indeed the turret 100 as a whole are held in place above the water bed and prevented from rotating by the tension in the mooring lines 106, 108. This firm holding of the turret 100 allows the tidal turbine assembly 150 to rotate relative to the water bed, for example to adapt to changing local currents.

In particular the assembly 150 yaws (rotates about the z-axis) approximately 180° when the tide changes direction. The turret mooring system 100 also allows the tidal turbine assembly 150 to adjust its orientation to better align the turbine(s) 158 with the local current flow vector, in cases where the tidal flow direction is not the same each cycle, e.g. due to local currents. This is an improvement over a fixed mooring system which can hold the assembly 150 rigidly at a fixed orientation or attitude, but in doing so necessarily sacrifices the ability to adapt to changes in flow direction.

The tidal turbine assembly 150 is shown in use, such that current is flowing (from the positive to the negative x-direction) and driving the turbine(s) 158. Marked on the Figure are various forces involved in this process. In particular, drag from the hull, drag from the beam and turbine thrust are combined into a net drag load, $F_D$. The net drag load acts from an effective centre of drag, which is very close to the turbine(s) 158, due to the turbine thrust dominating the drag forces.

A centre of gravity is marked as CoG, and the total mass M of the tidal turbine assembly 150 acts downwardly through the CoG. Similarly, the buoyancy $B_A$ of the tidal turbine assembly acts upwardly through the longitudinal centre of buoyancy, LCB. Note that in general the CoG and the LCB are not located at the same point.

The forces on the turret are the net vertical mooring load $T_z$ due to the downward force exerted by the tension in the mooring lines 106, 108. In addition, there is a net horizontal mooring load $T_x$ due to the horizontal components of the tension in the mooring lines 106, 108. Clearly if the tidal turbine apparatus 150 is to remain in place and not sink, $B_A$=M, and $T_x$=$F_D$, which can easily be achieved by careful design of the tidal turbine assembly 150, turret 100 and mooring lines 106, 108. However, this constraint only satisfies the static condition. When there is water flow, with only the above forces acting, it is possible to calculate the moments generated by each of these forces. As the forces do not in general pass through the longitudinal centre of buoyancy, they tend to cause rotations about the longitudinal centre of buoyancy.

Taking the clockwise direction as positive (the direction which maps the positive z-direction onto the positive x-direction in the shortest arc), these moments are as follows. The net drag force $F_D$ causes a moment $F_D \cdot z_2$, where $z_2$ is the vertical offset between the effective point of action of the net drag force and the longitudinal centre of buoyancy. The mass M of the tidal turbine assembly 150 acts to give a moment of $-M \cdot x_2$, where $x_2$ is the horizontal spacing (in the x-direction) between the centre of gravity and the longitudinal centre of buoyancy. Finally, the turret provides a moment of $T_z \cdot x_1 - T_x z_1$, where $x_1$ is the horizontal spacing (in the x-direction) between the turret 100 and the longitudinal centre of buoyancy and $z_1$ is the vertical spacing between the chain table (specifically the location of the connection between the chain table 104 and the mooring lines 106, 108), and the longitudinal centre of buoyancy.

Stable arrangements (ones which do not rotate due to the forces) are those in which $\Sigma_i\, m_i = F_D z_2 + T_z x_1 - T_x z_1 - Mx_2 = 0$, where $m_i$ represents the moments from each source described above. Otherwise the tidal turbine assembly 150 will rotate due to the forces acting along lines which do not pass through the longitudinal centre of buoyancy. The tidal turbine assembly 150 will rotate clockwise if $\Sigma m_i$ is positive, and anti-clockwise if this sum is negative. This changes the orientation of the assembly 150 in the water, and also changes the values of $x_1$, $x_2$, $z_1$, $z_2$. The rotation continues until a stable configuration is found. For example, the assembly 150 may be in a stable configuration when no current is flowing, meaning that $F_D$ and $T_x$ are zero. As the current flow rate increases, the forces $F_D$ and $T_x$ increase, but due to mooring line dynamics they are not necessarily equal (meaning e.g. that the assembly 150 drifts backward a little until equilibrium is restored). Similarly, in general $z_1 \neq z_2$ with the net result being that moments introduced due to the current flow do not match, so the assembly 150 rotates. Usually the result is a clockwise rotation, driving the bow of the assembly 150 (positive x-direction) into the water, while the stern (negative x-direction) and the turbine(s) 158 is/are raised. It is clearly a problem if a significant portion of the turbine(s) 158 is/are raised out of the water, as power generation will be impacted. Even in cases where the turbine(s) 158 remain(s) fully submerged, the turbine(s) 158 may no longer be in the optimum part of the stream for generating power, so resisting this motion is important.

The present invention addresses this problem by providing an additional moment at the turret 100. Specifically, the turret 100 is configured to provide an upward force to the tidal turbine assembly 150. In some examples, this is a fixed buoyancy, in others it is a variable buoyancy. In yet further examples, it is a hydrodynamic fairing on the chain table 104, and in some examples it is a combination of two or more of these. The addition of an upward force at the turret 100 changes the moment equation to $\Sigma_i\, m_i = F_D z_2 + (T_z - L - B)x_1 - T_x z_1 - Mx_2$, in which L and B are the hydrodynamic lift and buoyancy respectively. These can be chosen to counteract the pitching (rotation about the y-axis) caused by the turbines 158. In particular, both L and $F_D$ vary with flow velocity, so the hydrodynamic surface can be designed to give an L which dynamically counteracts the pitching moment caused by the turbine thrust. The buoyancy can be variable to provide a further time varying force, to fine tune the balancing of the moments. In other words, adding an upward force at the turret 100 can change the orientations of the tidal turbine assembly 150 which result in a stable arrangement. In particular, the stable arrangements can be brought closer to a flat orientation (bow-stern line is broadly horizontal).

Although not shown in detail in FIG. 1, the turret 100 may be arranged to slide vertically relative to the tidal turbine apparatus 150. This can allow further adjustment of the stable positions of the apparatus 150 by changing the $z_1$ distance and hence the magnitude of the moment due to the x-component of the mooring load generated by the turret 100. This vertical motion can also be useful in reducing the draft of the assembly 150 while transporting the assembly 150 to the installation site by raising the turret 100 while transporting the assembly 150 to the installation site. This in turn allows the turret 100 to be installed into the assembly 150 on dry land or in the relatively calm waters of a dock or harbour, without impacting the efficiency of the transport process. Once the assembly 150 arrives at the installation site, the turret 100 can be secured to the water bed using the mooring lines 106, 108. In other examples, the turret 100 can be anchored to the water bed prior to the arrival of the assembly 150 at the installation site.

Also not shown in detail in FIG. 1 is a power transfer arrangement to allow power generated by the turbine(s) 158 to be transmitted to shore. This arrangement includes a slip ring between the turbine assembly 150 and the turret 100 so that the power can be safely transferred to the turret 100 through the rotational connection between the turret 100 and the assembly 150. The power can be transferred to shore by a riser cable (also not shown), running alongside the mooring lines 106, 108, and run along the water bed to the shore. One or more slip rings can also be used to control the transmission of control signals to the turret if needed. Alternatively short range wireless communications can be used for control signals between the assembly 150 and turret 100.

Although FIG. 1 does not show this in detail, in some cases the turret 100 may be slidable in a vertical (or z) direction, relative to the assembly 150, for at least a portion of the length of the shaft 102. In such cases, the sliding motion is selectively lockable to allow the turret 100 to be maintained at a fixed height relative to the assembly 150. As noted elsewhere herein, the turret 100 may be configured to impart an upward force to the assembly 150. The locking mechanism (not shown) is strong enough to resist relative motion between the turret 100 and the assembly 150 when the locking mechanism is lock, even under the application of such an upward force, in order that the force is fully transmitted to the assembly 150.

Figure 2:
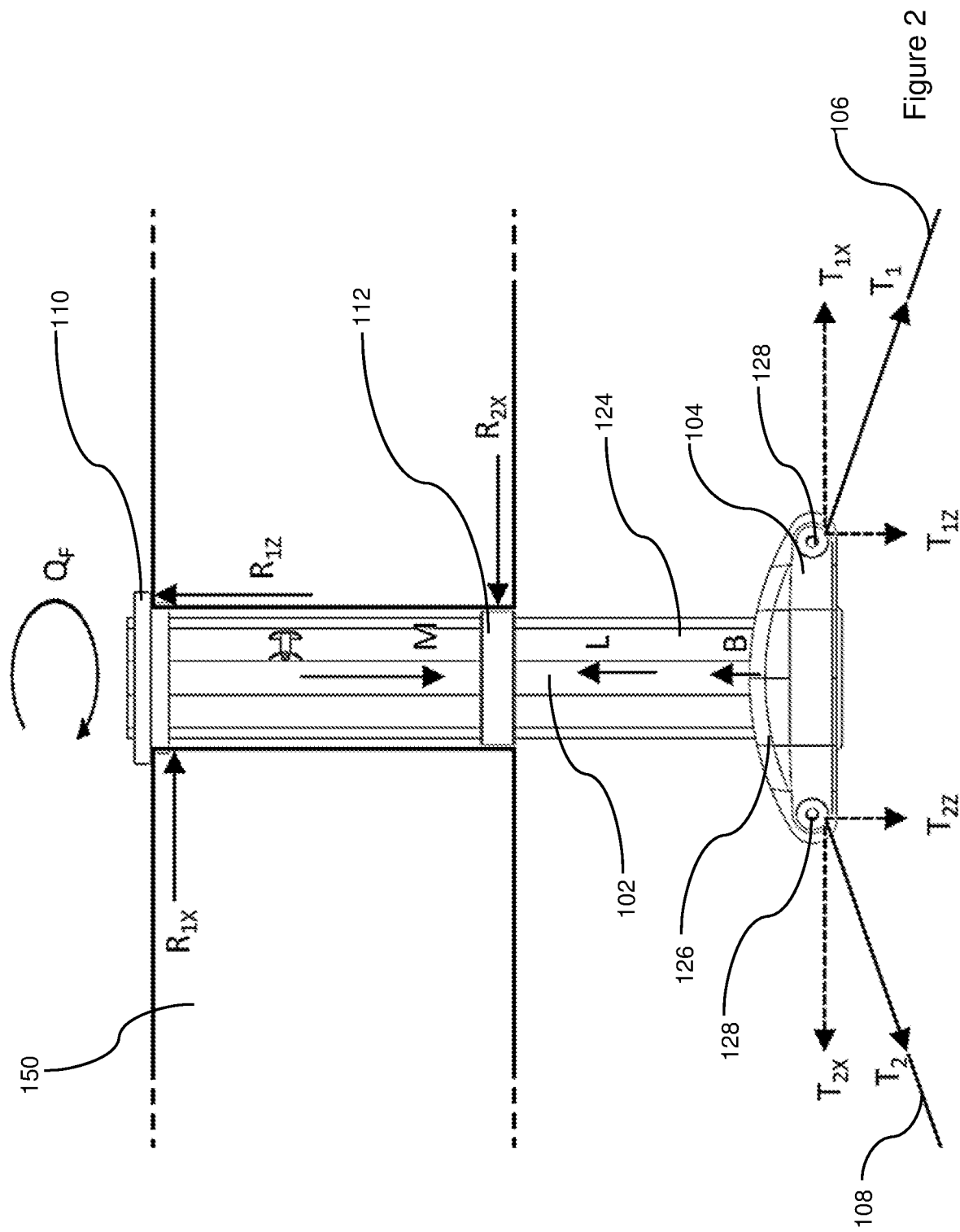
FIG. 2 shows a side elevation of the turret of FIG. 1 in detail.

Turning now to FIG. 2, the turret 100 is shown in a little more detail mounted into the tidal turbine assembly 150. As before, the forces L and B are shown acting on the turret 100, representing respectively a hydrodynamic lift effect and a buoyancy of the turret 100. The force $T_1$ represents the tension in the upstream mooring line 106, and $T_2$ the tension in the downstream mooring line 108. These are resolved into x (horizontal) and z (vertical) components $T_{1x}$, $T_{1z}$, $T_{2x}$, $T_{2z}$. The mooring lines couple to the chain table 104 at attachment points 128. Also shown in the Figure is the weight due to the mass, M, of the turret.

The tidal turbine assembly 150 has a cylindrical mounting aperture for receiving the turret 100. The turret 100 has an upper radial bearing 110 and a lower radial bearing 112 for engaging an inner surface of the cylindrical mounting aperture. Each radial bearing 110, 112 is arranged to allow relative rotational motion between the turret 100 and the tidal turbine assembly 150. However, the various forces discussed above result in frictional forces between the turret 100 and the turbine assembly 150. In particular, the upper radial bearing has a radial reaction force $R_{1x}$ and a vertical reaction force of $R_{1z}$, while the lower radial bearing has a radial reaction force of $R_{2x}$. The coefficients of friction for these reaction forces are written as $\mu_{1x}$, $\mu_{1z}$ and $\mu_{2x}$ respectively.

The net effect of the reaction forces is to provide a frictional torque represented in FIG. 2 as $Q_F$. In effect, this is the torque which must be exerted between the turret 100 and the turbine assembly 150 in order for the assembly 150 to rotate relative to the turret 100, and thereby to achieve the intended yawing effect. Written out in full, with the turret 100 having a radius r (the effective radius at which the radial bearings contact the turbine assembly 150) the frictional torque is $Q_F = r \cdot (\mu_{1z} R_{1z} + \mu_{1x} R_{1x} \mu_{2x} R_{2x})$.

While the radial bearings 110, 112 can be designed to reduce friction as far as possible, this is of only limited benefit to the present system. This is due to the bidirectional nature of tidal turbine assemblies 150 and the fact that the yawing action occurs when the tide is low and there is no net current. At slack low tide in an ideal system, $T_1 = T_2$, so $R_{1x} = R_{2x} = 0$, meaning that the dominant contribution to the frictional force is due to the vertical component. More specifically, given that the lift force, L is zero when no current is flowing, the frictional torque is $Q_F = r \cdot \mu_{1z} \cdot R_{1z} = r \cdot \mu_{1z} \cdot (T_{1z} + T_{2z} - B)$. In other words, if a fixed buoyancy generates an upward force equal to the sum of the vertical components of tension for each mooring line 106, 108, then the frictional torque at slack low tide is at a minimum, and impedance to relative to rotation between the turret 100 and the assembly 150 is also at a minimum. Thus a fixed buoyancy directly addresses the problem of the assembly 150 being unable to rotate about the turret 100. Of course, the period at which absolutely no current flows during a tidal change is relatively short. In such cases, hydrodynamic lift, L, will be present which can be factored into the analysis to ensure that the resultant frictional force is at a minimum. The buoyancy and lift forces will of course also have the effect of counteracting pitching forces described above.

FIG. 2 also shows a hydrodynamic surface 126 for providing the lift forces, L. More specifically, the hydrodynamic surface 126 is formed as a fairing on the chain table 104. In other cases the hydrodynamic surface may additionally or alternatively include portions extending beyond the chain table 104, for example an elongate wing-type structure extending in the y-direction from the chain table 104, in order to increase the lift force while retaining a reasonably small turret 100.

In FIG. 2, the hydrodynamic surface 126 is bidirectional in the sense that lift is generated when water flows over the surface in either direction. More specifically the surface 126 is symmetric, meaning that the lift generated at a given flow speed is the same whether the water is flowing in the positive or negative x-direction. This means that the effect described above in which the fairing 126 counteracts pitching moments can be arranged to exist irrespective of whether the tide is coming in or going out. In other examples, it may be beneficial for the hydrodynamic surface to behave differently in response to flow in opposite directions. A buoyant element (for providing the fixed or variable buoyancy described above) can be located within the fairing 126, which can protect the buoyant element from damage and in the case of the buoyancy being based on a submerged air pocket, the fairing can provide an outer envelope to retain the air below the water.

Figure 3:
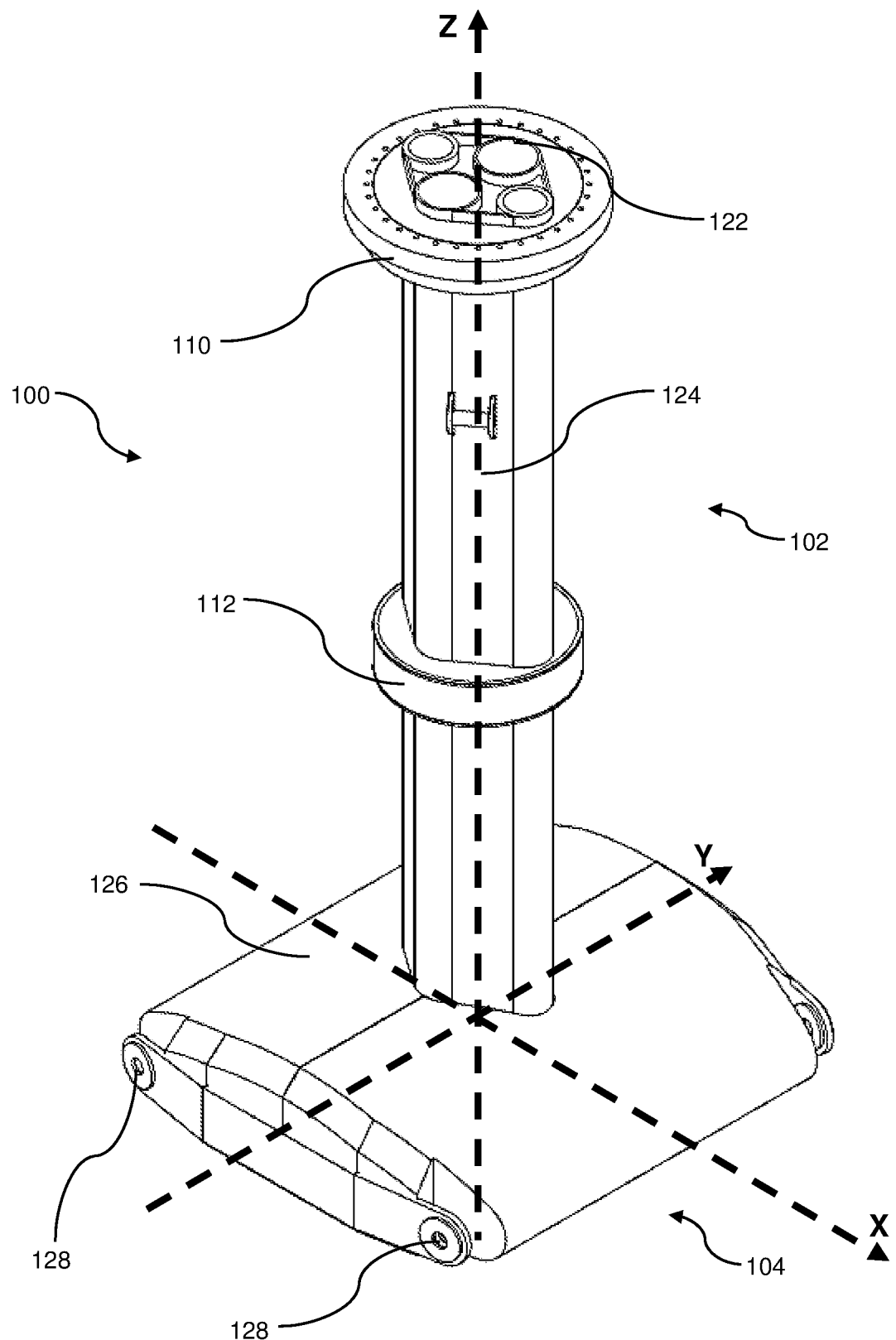
FIG. 3 shows a detailed perspective view of the turret of FIG. 1 separately from the tidal turbine assembly.

Consider now FIG. 3. Here a detailed view of the turret can be seen along with the x, y and z axes clearly marked. The chain table 104 is generally rigid and has four attachment points 128 for coupling mooring lines to the chain table 104, as described in more detail below, located at four corners of the chain table 104. The rigid chain table 104 holds the attachment points 128 spaced apart, with the upstream and downstream pairs of attachment points 128 held spaced apart from one another in the x-direction. Additionally, each pair of attachment points 128 (upstream pair and downstream pair) includes two attachment points 128 spaced apart from each other in the y-direction.

The shaft 102 is seen to be formed from a cluster of pipes 122, surrounded by an outer casing. This provided a cheap and easy way of forming a strong shaft 102. The general arrangement of pipes 122 and the outer casing 124 can be arranged to reduce drag on the turret 100. In the example shown, the outer casing 124 is broadly diamond-shaped in plan view, with the narrow angles lying along the x-direction (i.e. along the direction of flow), to streamline the shaft 102. The pipes 122 themselves also provide a convenient means to communicate between the chain table 104 and the assembly 150. For example, where the chain table 104 includes a variable buoyancy element, the buoyancy can be adjusted by pumping air into the chain table 104 via one of the pipes 122, which can be adapted for this purpose.

Additionally or alternatively separate pipes 122 may be used to transit power generated by the turbine(s) 158 away from the assembly 150 and to shore, and to carry communication messages to/from the turbine assembly 150 from/to the chain table and/or onward to/from the shore. In some examples, communication between the shore and the assembly can allow control of various aspects of operation of the turbine assembly 150 from the shore, for example raising the turbine(s) 158 out of the water to prevent damage in rough seas, which can be advantageous when the seas are so rough that it would be impractical or unsafe to physically attend the assembly 150 in a boat or even by air to alter the setting s or arrangement of the assembly 150.

Figure 4:
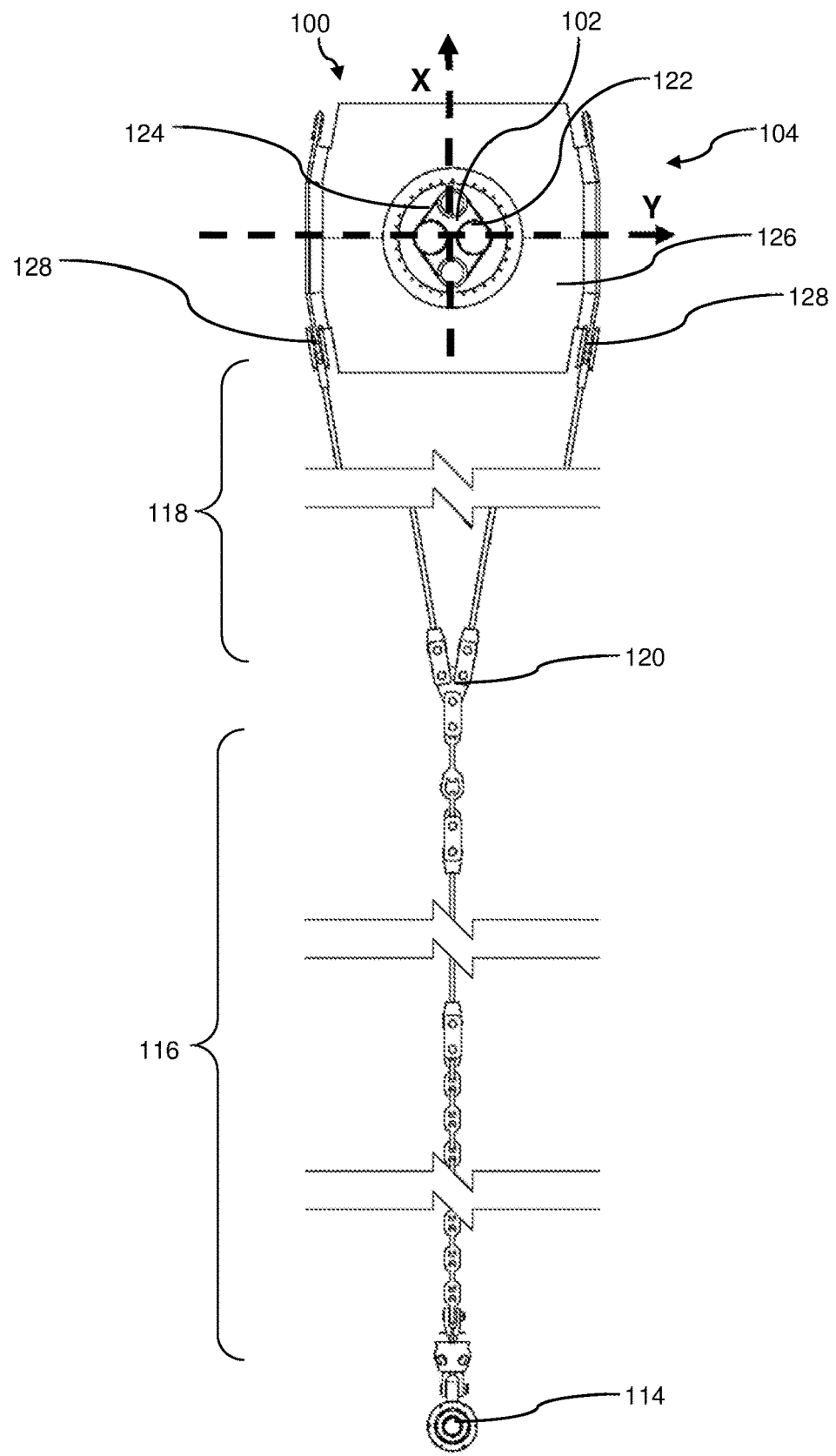
FIG. 4 shows a plan view of a mooring system including the turret of FIG. 1.

Turning now to FIG. 4, the turret 100 of FIG. 3 is shown in plan view, coupled to a mooring line. Note that while FIG. 4 only shows one mooring line at the bottom of the Figure, the full mooring system would include two mooring lines (as shown in e.g. FIGS. 1 and 2). The mooring line shown in FIG. 4 corresponds to one of the mooring lines 106, 108 shown in FIGS. 1 and 2.

FIG. 4 shows a mooring line coupled to the chain table 104. The mooring line has a first portion 116 for coupling at a lower end to an anchoring point 114 on the water bed. The first portion connects at its upper end to a bridle 120. The bridle 120 has three attachment points, one of which is connected to the first portion 116. The remaining two attachment points on the bridle 120 couple to a second portion 118 of the mooring line. The second portion 118 of the mooring line includes two lines providing parallel load paths and which diverge from the bridle 120 to couple to two attachment points 128 on the chain table 104. In other words, the mooring line is a bifurcated mooring line, in the sense that it bifurcates into two attachments at an upper end, but is anchored to a single point 114 on the water bed.

The two attachment points 128 to which the second portion 118 of the mooring line is coupled are spaced apart in the y-direction. This allows the single mooring line to provide a greater resistance to the rotation of the turret 100 relative to the water bed than would be possible with a single attachment point 128 on the chain table 104. As an example, consider a rotation of the turret 100 shown in FIG. 4 relative to the water bed. Whichever direction the turret 100 rotates in, one or other of the two diverging strands of the second portion 118 will be under tension. This means that rotation of the turret 100 in either direction is resisted by the mooring system. As an example, the mooring lines may connect to the chain table 104 with a y-axis spacing between the attachment points 128 of around 1 metre, which has been found to be a large enough spacing to achieve the desired effect in most cases. In other examples, the spacing may be larger or smaller, depending on the specific implementation envisaged.

The first portion 116 of the mooring line is formed as a chain, which can provide a strong coupling. The second portion 118 of the mooring line is formed of low mass synthetic material such as aramid fibre lines, e.g. Dyneema®. This allows the lines to be made from a suitable material to resist the require tension loads, but without introducing too much mass to the chain table 104. The location of the bifurcation (i.e. the bridle 120 in FIG. 4) is shown relatively close to the turret 100 (certainly closer to the turret 100 than the bridle is to the attachment point 114). In most cases, the bridle 120 or bifurcation should be located no more than 10% of the total length of the mooring line away from the turret 100, more specifically from the attachment points 128 on the chain table 104 (i.e. 90% or more of the length of the mooring line measured from the anchoring point 114 on the water bed).

In a little more detail the first portion 116 of the mooring line, being a chain, is heavy and provides a restoring force to the turret 100. This is best seen with reference to FIG. 2, in which the tension forces $T_1$ and $T_2$ include a contribution from the weight of the respective mooring lines 106, 108. Providing a bifurcation in the mooring line causes this tension to be distributed between the two attachment points 128. The result of this is that an equilibrium position exists for the turret where the tension in each of the two divergent strands of the second portion 118 of the mooring line cause an equal and opposite turning moment) at the turret 100 (around its rotational axis, due to the symmetry of the turret 100, visible in FIG. 3), thus balancing the torque and causing no rotation. Where the lengths of the two divergent strands are equal, the equilibrium position will be one shown in FIG. 4.

Specifically, the equilibrium position shown in FIG. 4 is one in which a first line drawn in the direction (in the x-y plane) of the first portion 116 of the mooring line is extended until it reaches the chain table 140. This first line intersects a second line, drawn between the two attachment points 128, at a right angle. It can be clearly seen in FIG. 4 that rotations of the turret 100 in any one direction will increase the tension in one of the two divergent strands while the other becomes slack and the tension reduces (in some cases dramatically, and even becoming substantially zero). To be explicit, as shown in FIG. 4, a clockwise rotation of the turret 100 causes tension in the left of the two strands to increase, while tension in the right strand reduces dramatically, and vice-versa.

The bifurcated mooring line in FIG. 4 has an advantage over a pair of independent single mooring lines, each coupled to a different respective point on the water bed, quite apart from the improved simplicity of the installation (e.g. requiring half the number of anchoring points on the water bed to be installed). In general independent mooring lines, when the lines are reasonably slack, provide a different magnitude of tension force on each attachment point 128. This is because the slackness of each line affects the tension in that line, and thus the location of the turret 100 relative to the anchor points 114 on the water bed (e.g. due to drifting under wave or current motion) can cause differential tension between the two mooring lines, and thus a rotation of the turret 100 relative to the water bed. Counterintuitively, therefore using two independent mooring lines for this task can result in the very rotations which the mooring system is intended to prevent.

By contrast, the bifurcated mooring lines of FIG. 4 provide the same tension force up to the bridle 120, meaning that it is only rotations of the turret 100 relative to the axis defined by a straight line from the anchoring point 114 and the bridle 120 location which cause differential tension. Consequently, the bifurcated mooring system is better at retaining the turret 100 in its intended orientation, as the mooring system preferentially supports the turret 100 against rotation relative to the water bed.

Although not shown, the chain table 104 is connectable to a second mooring line via additional attachment points 128. The second mooring line can be of the same design as the first mooring line, which has the same advantages. In other examples, the second mooring line may be a simpler design, having just a single attachment point 128 on the chain table 104. This can be possible where the tidal flow is asymmetric, such that the tangling problem described above is most likely to occur in one flow direction, but relatively unlikely to occur in the other flow direction. Such installation sites may also make use of asymmetric hydrodynamic fairings, for much the same reasons.

This mooring system having spaced apart attachment points 128 on the chain table 104 provides a stronger resistance to rotation of the turret 100 relative to the water bed. Alone or in combination with the systems described above (in which upward forces at the turret 100 reduce friction), this reduces the likelihood of tangling of the mooring lines 106, 108 occurring, since the turret 100 is held securely. Indeed, in combination, the effect of increasing the torque exerted between the turret 100 and the tidal turbine assembly 150 (due to the bifurcated mooring line arrangement) and the reduction in friction (due to the upward force provided by the turret 100) both work towards the common goal of ensuring that the tidal turbine assembly 150 rotates relative to the turret 100 when the current changes direction, thereby reducing tangling.

Figure 5:
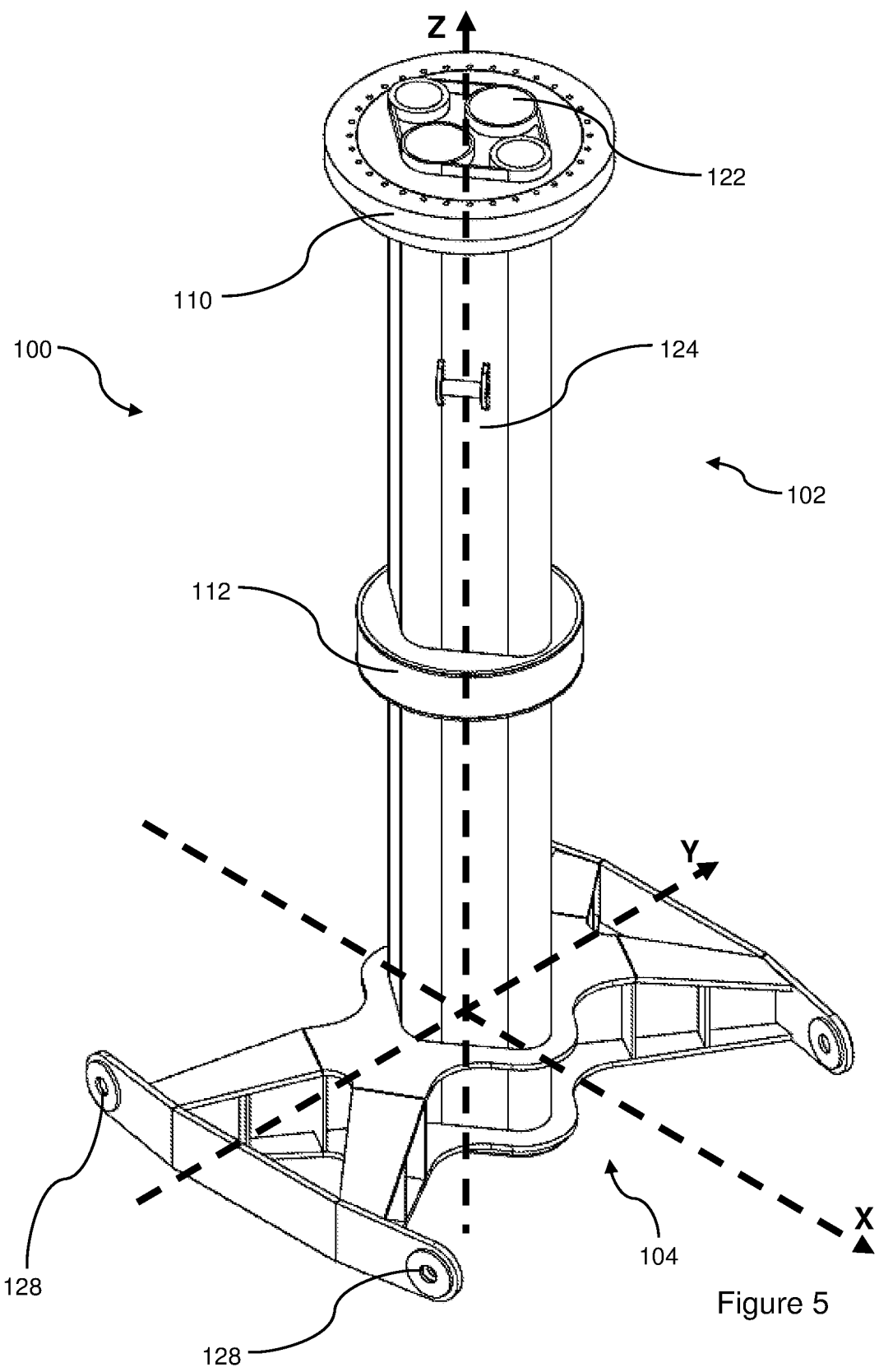
FIG. 5 shows a detailed perspective view of a second example of a turret.
Figure 6:
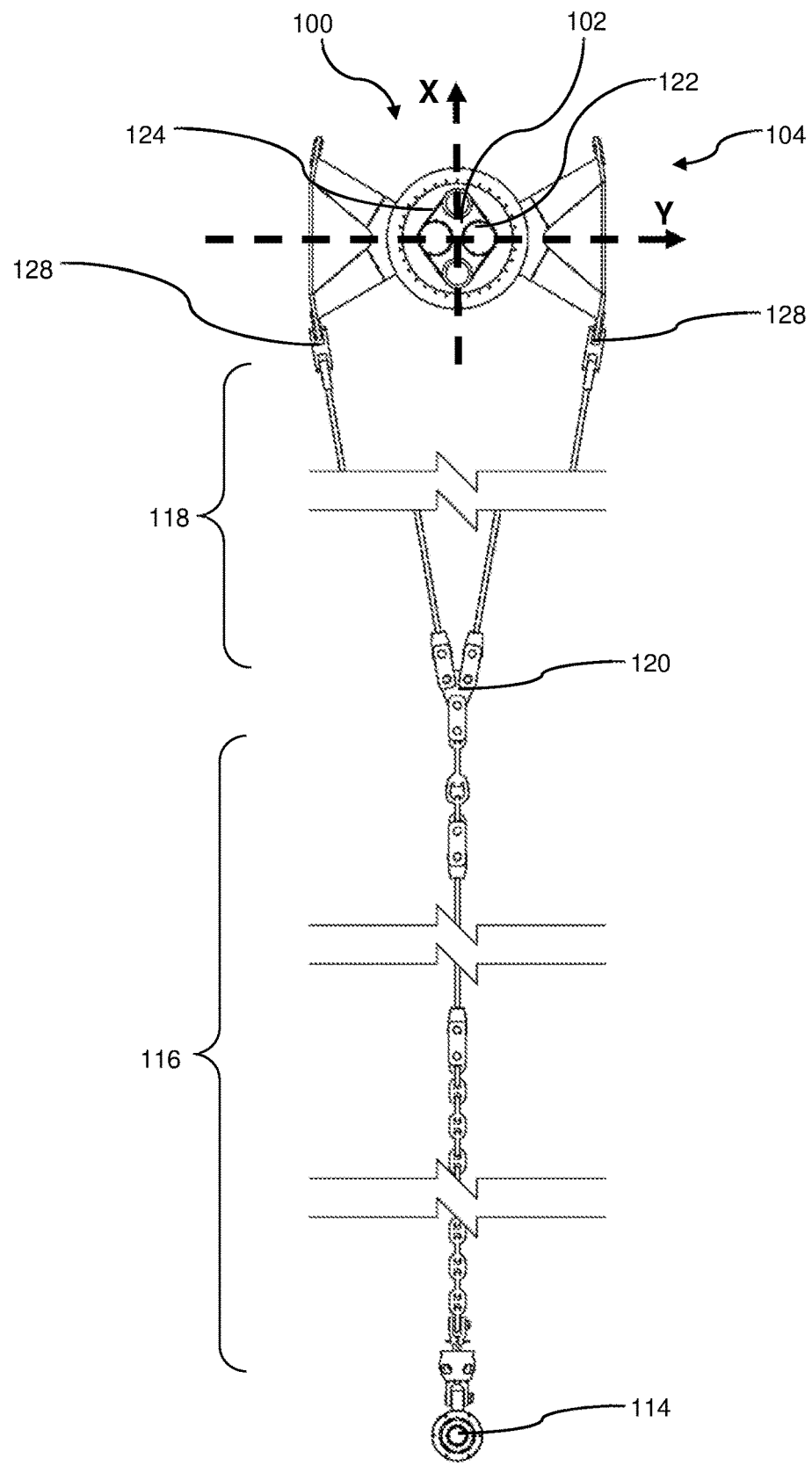
FIG. 6 shows a plan view of a mooring system including the turret of FIG. 5.

FIGS. 5 and 6 show an alternative design for the turret 100, in perspective and plan views respectively. FIGS. 5 and 6 are broadly equivalent to FIGS. 3 and 4, and the common features will not be described in detail again. However, in FIGS. 5 and 6 there is no fairing 126, and the internal structure of the chain table 104 is visible. In particular a comparison of FIGS. 3 and 4 with FIGS. 5 and 6 shows that a majority of the volume of the chain table 104 (the region inside the fairing 126) is available for storing a buoyant element. In addition, the design shown in FIGS. 5 and 6, can be used as shown as part of the disclosure herein, specifically that the attachment points 128 for the mooring lines are spaced apart in the y-direction, which can help reduce incidences of tangling in the manner described above. In some cases, the effect provided by the mooring lines can be so strong that there is no need for additional effects provided by buoyancy or hydrodynamic lift.

As can be seen in the foregoing, the present application sets out many advantageous features, which are summarised in general here. First, the specific adaptation of the chain table to turret-moored tidal turbine devices allows for systems of greater stability in the sense that the turret can resist rotating relative to the water bed, thereby allowing the actual turbine assembly to rotate around to align with local current flow.

This effect is particularly difficult to achieve with floating structures and in particular floating turbine structures, due to their large draft and drag (due to the turbines sitting below the surface). As noted above this can lead to the turret being twisted with the turbine apparatus and cause twisting of the mooring lines. In addition, the turbines risk being swung round into the mooring lines themselves, damaging the turbines, the mooring lines, or both.

When applying turret mooring systems to tidal turbine arrays, a dilemma is encountered: on the one hand reducing the complexity of mooring systems (in particular, providing fewer anchoring points on the water bed) saves installation costs and provides fewer underwater obstacles to obstruct the motion of the turbines as the device swings around in changing current flow. On the other hand, fewer mooring lines has tended to increase the chance that the turret cannot hold itself rotationally fixed with respect to the water bed, and results in tangling and twisting of the mooring lines.

The present application presents a solution in which spaced apart attachment points on the chain table help to provide increased rotational resistance (relative to the water bed). The effect is so pronounced that tidal turbine assemblies can be anchored in this way using only two bifurcated mooring lines—an upstream mooring line and a downstream mooring line, even in cases where the mooring lines are to be coupled to a relatively small region of the turret, such as the chain table. This effect can be achieved using only cables or chains as part of the mooring system. In other words, other than the chain table, the mooring system may be almost entirely free of rigid bracing elements, representing a further saving in cost and complexity.

Another advantageous aspect is the provision of a turret and/or chain table which provides an upward force. Not only does it provide a location for supporting the mooring lines (as is trivially true for all turret moorings), but it provides an upward force to the turbine assembly itself. In other words, the equilibrium depth of the turret floating alone (detached from the assembly) is higher than the depth at which the turret floats at equilibrium when mounted into the turbine assembly.

This feature allows the turret to counteract the pitching moments of the assembly which arise due to the large thrust forces experiences by the turbines when deployed in current. Moreover, the upward force from the turret may be variable to counteract the variable pitching motions due to varying thrust from the turbines. This upward force variation can be achieved by adjusting the buoyancy, use of hydrodynamic surfaces, or both (or indeed by other methods entirely). This allows the attitude of the assembly as a whole to be controlled, as well as providing stability.

This is a problem very specific to tidal turbine assemblies, since most turret-moored devices do not experience such strong and variable thrust forces. This means that most turret moored systems would not need a turret which produces an upward force at all, let alone a variable one, as doing so would in fact destabilise those systems or cause unwanted pitching or slanting of the assembly.

The invention claimed is:

1. A turret mooring system for a tidal turbine assembly, the turret mooring system comprising:
   a turret having:
   a shaft for mounting to the tidal turbine assembly and for allowing relative motion between the turret and the tidal turbine assembly about a rotational axis; and a chain table secured to a lower end of the shaft;

an upstream mooring line for coupling a single upstream anchoring point on a water bed to an upstream portion of the chain table; and a downstream mooring line for coupling a single downstream anchoring point on the water bed to a downstream portion of the chain table; wherein the upstream mooring line is a bifurcated mooring line for coupling to two spaced apart upstream attachment points on the upstream portion of the chain table; and/or wherein the downstream mooring line is a bifurcated mooring line for coupling to two spaced apart downstream attachment points on the downstream portion of the chain table; wherein:

the turret is arranged to provide an upward force when the chain table is submerged in water; and the upward force is provided by a hydrodynamic fairing on the chain table.

2. The turret mooring system of claim 1, wherein the spaced apart upstream and/or downstream attachment points on the chain table are spaced apart by at least 1 metre.

3. The turret mooring system of claim 1, wherein the upstream mooring line has a first portion for coupling the upstream anchoring point on the sea bed to a bridle and a second portion for coupling the bridle to two upstream attachment points on the upstream portion of the chain table; and/or wherein the downstream mooring line has a first portion for coupling the downstream anchoring point on the sea bed to a bridle and a second portion for coupling the bridle to two downstream attachment points on the downstream portion of the chain table.

4. The turret mooring system of claim 3 wherein the first and second portions of the upstream or downstream mooring line are made from different materials.

5. The turret mooring system of claim 4, wherein the first portion of the upstream or downstream mooring line is a chain and/or the second portion of the upstream or downstream mooring line is a pair of synthetic cables.

6. The turret mooring system of claim 1, wherein the hydrodynamic fairing has a variable buoyancy.

7. The turret mooring system of claim 1, wherein the hydrodynamic fairing is bi-directional.

8. The turret mooring system of claim 1, wherein the hydrodynamic fairing is symmetric in an upstream-downstream direction.

9. The turret mooring system of claim 1, wherein the hydrodynamic fairing is shaped to counteract expected pitching moments in the tidal turbine assembly due to drag on turbines of the tidal turbine assembly.

10. The turret mooring system of preceding claim 1, wherein the shaft includes an upper radial bearing and a lower radial bearing for engaging with the tidal turbine assembly.

11. The turret mooring system of claim 1, wherein the turret is mounted into the tidal turbine assembly.

12. The turret mooring system of claim 11 wherein the turret is slidable in a vertical direction relative to the tidal turbine assembly.

13. A method of mooring a tidal turbine assembly to a water bed using the turret mooring system of claim 1, the method comprising:

(i) transporting the tidal turbine assembly to an installation site;

(ii) coupling an upstream portion of the chain table of the turret to the water bed at a single upstream anchoring point and coupling a downstream portion of the chain table of the turret to the water bed at a single downstream anchoring point; and (iii) securing the turret into the tidal turbine assembly.

14. The method of claim 13, wherein step (iii) is performed prior to steps (i) and (ii), and step (iii) is performed in a dock or on land.

15. The method of claim 14, wherein once step (iii) has been completed, the turret is slidable in a vertical direction relative to the tidal turbine assembly between a raised position and a lowered position such that a draft of the tidal turbine assembly is greater when the turret is in the lowered position than when the turret it is in the raised position.

16. The method of claim 15, wherein the turret is in the raised position during step (i).

17. The method of claim 13, wherein the tidal turbine assembly includes one or more turbines which are configurable in a deployed arrangement in which they are below an expected water line, and also in a raised arrangement in which the turbines are entirely above the expected water line; and wherein the turbines are further configured in the raised arrangement during step (i).

* * * * *